A. B. CRANE.
CALENDAR.
APPLICATION FILED JAN. 9, 1917.

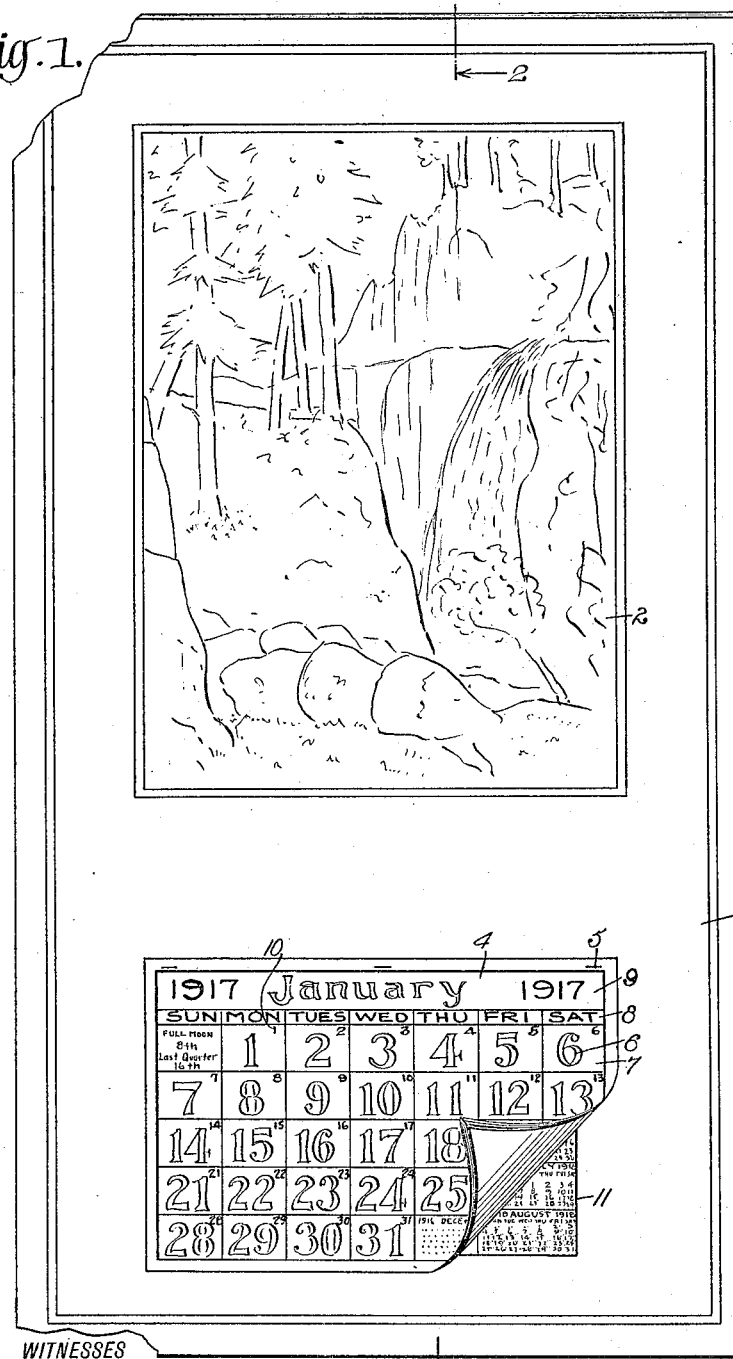
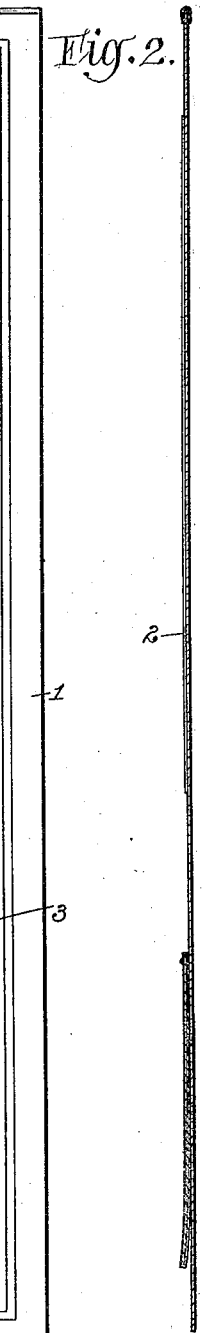

1,274,994. Patented Aug. 6, 1918.
3 SHEETS—SHEET 2.

1917  CALE

| 1917 | JANUARY | | | | | 1917 |
|---|---|---|---|---|---|---|
| SUN | MON | TUE | WED | THU | FRI | SAT |
|  | 1[1] | 2[2] | 3[3] | 4[4] | 5[5] | 6[6] |
| 7[7] | 8[8] | 9[9] | 10[10] | 11[11] | 12[12] | 13[13] |
| 14[14] | 15[15] | 16[16] | 17[17] | 18[18] | 19[19] | 20[20] |
| 21[21] | 22[22] | 23[23] | 24[24] | 25[25] | 26[26] | 27[27] |
| 28[28] | 29[29] | 30[30] | 31[31] |  |  |  |

| 1917 | APRIL | | | | | 1917 |
|---|---|---|---|---|---|---|
| SUN | MON | TUE | WED | THU | FRI | SAT |
| 1[90] | 2[91] | 3[92] | 4[93] | 5[94] | 6[95] | 7[96] |
| 8[97] | 9[98] | 10[99] | 11[100] | 12[101] | 13[102] | 14[103] |
| 15[104] | 16[105] | 17[106] | 18[107] | 19[108] | 20[109] | 21[110] |
| 22[111] | 23[112] | 24[113] | 25[114] | 26[115] | 27[116] | 28[117] |
| 29[118] | 30[119] |  |  |  |  |  |

| 1917 | FEBRUARY | | | | | 1917 |
|---|---|---|---|---|---|---|
| SUN | MON | TUE | WED | THU | FRI | SAT |
|  |  |  |  | 1[32] | 2[33] | 3[34] |
| 4[35] | 5[36] | 6[37] | 7[38] | 8[39] | 9[40] | 10[41] |
| 11[42] | 12[43] | 13[44] | 14[45] | 15[46] | 16[47] | 17[48] |
| 18[49] | 19[50] | 20[51] | 21[52] | 22[53] | 23[54] | 24[55] |
| 25[56] | 26[57] | 27[58] | 28[59] |  |  |  |

| 1917 | MAY | | | | | 1917 |
|---|---|---|---|---|---|---|
| SUN | MON | TUE | WED | THU | FRI | SAT |
|  |  | 1[121] | 2[122] | 3[123] | 4[124] | 5[125] |
| 6[126] | 7[127] | 8[128] | 9[129] | 10[130] | 11[131] | 12[132] |
| 13[133] | 14[134] | 15[135] | 16[136] | 17[137] | 18[138] | 19[139] |
| 20[140] | 21[141] | 22[142] | 23[143] | 24[144] | 25[145] | 26[146] |
| 27[147] | 28[148] | 29[149] | 30[150] | 31[151] |  |  |

| 1917 | MARCH | | | | | 1917 |
|---|---|---|---|---|---|---|
| SUN | MON | TUE | WED | THU | FRI | SAT |
|  |  |  |  | 1[60] | 2[61] | 3[62] |
| 4[63] | 5[64] | 6[65] | 7[66] | 8[67] | 9[68] | 10[69] |
| 11[70] | 12[71] | 13[72] | 14[73] | 15[74] | 16[75] | 17[76] |
| 18[77] | 19[78] | 20[79] | 21[80] | 22[81] | 23[82] | 24[83] |
| 25[84] | 26[85] | 27[86] | 28[87] | 29[88] | 30[89] | 31[90] |

| 1917 | JUNE | | | | | 1917 |
|---|---|---|---|---|---|---|
| SUN | MON | TUE | WED | THU | FRI | SAT |
|  |  |  |  |  | 1[152] | 2[153] |
| 3[154] | 4[155] | 5[156] | 6[157] | 7[158] | 8[159] | 9[160] |
| 10[161] | 11[162] | 12[163] | 13[164] | 14[165] | 15[166] | 16[167] |
| 17[168] | 18[169] | 19[170] | 20[171] | 21[172] | 22[173] | 23[174] |
| 24[175] | 25[176] | 26[177] | 27[178] | 28[179] | 29[180] | 30[181] |

| 1918 | JANUARY | | | | | 1918 |
|---|---|---|---|---|---|---|
| SUN | MON | TUE | WED | THU | FRI | SAT |
|  |  | 1[366] | 2[367] | 3[368] | 4[369] | 5[370] |
| 6[371] | 7[372] | 8[373] | 9[374] | 10[375] | 11[376] | 12[377] |
| 13[378] | 14[379] | 15[380] | 16[381] | 17[382] | 18[383] | 19[384] |
| 20[385] | 21[386] | 22[387] | 23[388] | 24[389] | 25[390] | 26[391] |
| 27[392] | 28[393] | 29[394] | 30[395] | 31[396] |  |  |

| 1918 | MARCH | | | | | 1918 |
|---|---|---|---|---|---|---|
| SUN | MON | TUE | WED | THU | FRI | SAT |
|  |  |  |  |  | 1[425] | 2[426] |
| 3[427] | 4[428] | 5[429] | 6[430] | 7[431] | 8[432] | 9[433] |
| 10[434] | 11[435] | 12[436] | 13[437] | 14[438] | 15[439] | 16[440] |
| 17[441] | 18[442] | 19[443] | 20[444] | 21[445] | 22[446] | 23[447] |
| 24[448]/31[455] | 25[449] | 26[450] | 27[451] | 28[452] | 29[453] | 30[454] |

| 1918 | FEBRUARY | | | | | 1918 |
|---|---|---|---|---|---|---|
| SUN | MON | TUE | WED | THU | FRI | SAT |
|  |  |  |  |  | 1[397] | 2[398] |
| 3[399] | 4[400] | 5[401] | 6[402] | 7[403] | 8[404] | 9[405] |
| 10[406] | 11[407] | 12[408] | 13[409] | 14[410] | 15[411] | 16[412] |
| 17[413] | 18[414] | 19[415] | 20[416] | 21[417] | 22[418] | 23[419] |
| 24[420] | 25[421] | 26[422] | 27[423] | 28[424] |  |  |

| 1918 | APRIL | | | | | 1918 |
|---|---|---|---|---|---|---|
| SUN | MON | TUE | WED | THU | FRI | SAT |
|  | 1[456] | 2[457] | 3[458] | 4[459] | 5[460] | 6[461] |
| 7[462] | 8[463] | 9[464] | 10[465] | 11[466] | 12[467] | 13[468] |
| 14[469] | 15[470] | 16[471] | 17[472] | 18[473] | 19[474] | 20[475] |
| 21[476] | 22[477] | 23[478] | 24[479] | 25[480] | 26[481] | 27[482] |
| 28[483] | 29[484] | 30[485] |  |  |  |  |

WITNESSES
Frederick Wiehl.
W. Kitchin

*Fig. 3a.*

INVENTOR
A. B. Crane
BY Mm & Co
ATTORNEYS

THE NORRIS PETERS CO., PHOTO-LITHO., WASHINGTON, D. C.

A. B. CRANE.
CALENDAR.
APPLICATION FILED JAN. 9, 1917.

1,274,994.

Patented Aug. 6, 1918.
3 SHEETS—SHEET 3.

NDAR            1917

| 1917 JULY 1917 | 1917 OCTOBER 1917 |
|---|---|
| SUN MON TUE WED THU FRI SAT | SUN MON TUE WED THU FRI SAT |
| 1 2 3 4 5 6 7 | .. 1 2 3 4 5 6 |
| 8 9 10 11 12 13 14 | 7 8 9 10 11 12 13 |
| 15 16 17 18 19 20 21 | 14 15 16 17 18 19 20 |
| 22 23 24 25 26 27 28 | 21 22 23 24 25 26 27 |
| 29 30 31 .. .. .. .. | 28 29 30 31 .. .. .. |

| 1917 AUGUST 1917 | 1917 NOVEMBER 1917 |
|---|---|
| SUN MON TUE WED THU FRI SAT | SUN MON TUE WED THU FRI SAT |
| .. .. .. 1 2 3 4 | .. .. .. .. 1 2 3 |
| 5 6 7 8 9 10 11 | 4 5 6 7 8 9 10 |
| 12 13 14 15 16 17 18 | 11 12 13 14 15 16 17 |
| 19 20 21 22 23 24 25 | 18 19 20 21 22 23 24 |
| 26 27 28 29 30 31 .. | 25 26 27 28 29 30 .. |

| 1917 SEPTEMBER 1917 | 1917 DECEMBER 1917 |
|---|---|
| SUN MON TUE WED THU FRI SAT | SUN MON TUE WED THU FRI SAT |
| .. .. .. .. .. .. 1 | .. .. .. .. .. .. 1 |
| 2 3 4 5 6 7 8 | 2 3 4 5 6 7 8 |
| 9 10 11 12 13 14 15 | 9 10 11 12 13 14 15 |
| 16 17 18 19 20 21 22 | 16 17 18 19 20 21 22 |
| 23/30 24 25 26 27 28 29 | 23/30 24/31 25 26 27 28 29 |

| 1918 MAY 1918 | 1918 JULY 1918 |
|---|---|
| SUN MON TUE WED THU FRI SAT | SUN MON TUE WED THU FRI SAT |
| .. .. .. 1 2 3 4 | .. 1 2 3 4 5 6 |
| 5 6 7 8 9 10 11 | 7 8 9 10 11 12 13 |
| 12 13 14 15 16 17 18 | 14 15 16 17 18 19 20 |
| 19 20 21 22 23 24 25 | 21 22 23 24 25 26 27 |
| 26 27 28 29 30 31 .. | 28 29 30 31 .. .. .. |

| 1918 JUNE 1918 | 1918 AUGUST 1918 |
|---|---|
| SUN MON TUE WED THU FRI SAT | SUN MON TUE WED THU FRI SAT |
| .. .. .. .. .. .. 1 | .. .. .. .. 1 2 3 |
| 2 3 4 5 6 7 8 | 4 5 6 7 8 9 10 |
| 9 10 11 12 13 14 15 | 11 12 13 14 15 16 17 |
| 16 17 18 19 20 21 22 | 18 19 20 21 22 23 24 |
| 23/30 24 25 26 27 28 29 | 25 26 27 28 29 30 31 |

WITNESSES
Frederick Diehl.
O. L. Kitchin.

Fig. 3b.

INVENTOR
A. B. Crane
BY
ATTORNEYS

UNITED STATES PATENT OFFICE.

ARTHUR BLOOMER CRANE, OF BELLEVILLE, NEW JERSEY.

CALENDAR.

1,274,994.     Specification of Letters Patent.     Patented Aug. 6, 1918.

Application filed January 9, 1917. Serial No. 141,376.

*To all whom it may concern:*

Be it known that I, ARTHUR B. CRANE, a citizen of the United States, and a resident of Belleville, in the county of Essex and State of New Jersey, have invented a new and Improved Calendar, of which the following is a full, clear, and exact description.

This invention relates to calendars and particularly to what are sometimes termed art calendars, and has for an object the provision of an improved arrangement whereby a useful result is secured in addition to an ornamental appearance, the same including a construction which will present in large figures the numbers of the days in a month and in smaller figures the numbers of the days in a year.

Another object in view is to provide a calendar with a pad showing the various months and a card in back of the pad showing a year or more with the large and small numbers for indicating the days of the month and the number of the day in the year or the number of the day in a longer period than a year.

In the accompanying drawings:—

Figure 1 is a front view of a calendar disclosing an embodiment of the invention, part of the pad thereof being folded over for better illustrating the construction.

Fig. 2 is a sectional view through Fig. 1 on line 2—2.

Fig. 3ª is a plan view of part of the card embodying certain features of the invention.

Fig. 3ᵇ shows the remaining part of the card disclosed in Fig. 3ª.

Referring to the accompanying drawings by numerals, 1 indicates a base which may be of any desired material, as for instance, a good quality of paper, on which a sheet 2 is secured, said sheet containing a picture or ornamental configuration of some kind. It is of course understood that the picture could be printed directly on the base 1 though it is preferable to have the same on a separate sheet as just mentioned. The base 1 may be printed with an ornamental border 3 if desired the same being of any preferred character.

Arranged at the lower part of the base 1 is a pad 4 held in position in any desired way, as for instance, by staples 5, said pad containing any desired number of sheets, as for instance, twelve so as to show the months of the year, Fig. 1 disclosing the month of January. The days of the month are indicated by large numbers 6 arranged in blocks 7, said blocks being formed in five horizontal rows and seven vertical rows with spaces 8 for the names of the days arranged above the vertical rows. A space 9 is provided for the name of the month and the year. Each of the blocks 7 which contains a large number also contains a small designating number 10, the numbers 10 for the month of January running from 1 to 31, as shown in Figs. 1 and 3ª. The small numbers for the months of February, however, run from 32 to 59, the same being numbered consecutively or, rather, continuously from January. The small numbers run in a similar manner through all of the months of the year so that December 31 is indicated by 365 in the small number column.

In addition to making the pad 4 in the manner just described with two sets of numbers, namely, the large numbers and a series of small numbers, a sheet or card 11 is provided in back of the pad 4, said sheet or card being printed directly on the base 1 or on a separate sheet and secured thereto. The card 11 is intended to contain a large number of blocks 12 (Figs. 3ª and 3ᵇ) which will show an entire year or more than a year, as for instance, a year and eight months. The large numbers indicated by 6 in all of the blocks 12 are correctly arranged for indicating the number of days in their respective months, while the small numbers 10 are consecutively arranged from 1 on January 1st to 608 on August 31st of the next succeeding year from the January 1st just mentioned. In Figs. 3ª and 3ᵇ January 1st, 1917, is provided with a small number 1 while August 31st, 1918, is provided with a small number 608.

This arrangement will allow a person using the card 11 to ascertain the number of days between any two dates by merely subtracting the days which have passed from the number desired. For instance, if on the 10th of April, 1917, it should be desired to know how many days there were between that date and August 31st, 1918, it will only be necessary to subtract 100 from 608 and the answer will be found, namely, 508.

It is to be understood that more months or a less number of months may be used than shown in Figs. 3ª and 3ᵇ without departing from the spirit of the invention provided they are formed with the rows of large numbers and the rows of small numbers. In case a pad should be provided for the base which is too small to cover the card 11, the same may be arranged on the back of the base or on a separate sheet and secured in position in any desired way.

What I claim is:

1. A calendar comprising a base, an ornamental sheet connected with said base near the upper part, a pad connected to the lower part, said pad containing a monthly calendar structure, and a card arranged on the base back of the pad formed with a calendar structure having large numbers for indicating the days of the month and a single series of small numbers indicating the days of the year from the first to the last consecutively.

2. A calendar comprising a base, a pad connected to said base containing sheets on which the monthly calendar designations are provided, and a card arranged on said base beneath the pad and normally covered thereby, said card being provided with blocks containing monthly calendar numbers, there being more than twelve blocks whereby a year and a fraction is shown, and a series of small numbers arranged adjacent each of the monthly calendar numbers, said series of small numbers beginning with one and ending with the highest number reached, the numbers being consecutive.

3. In a calendar of the character described, a sheet containing blocks provided with calendar numbers thereon indicating the days of the month, there being a sufficient number of blocks for indicating a year and a fraction, and a single series of small numbers arranged on said card, there being one small number for each calendar number, said series of small numbers being arranged consecutively from the first day of the first month to the last day of the last month shown on the card.

ARTHUR BLOOMER CRANE.

Copies of this patent may be obtained for five cents each, by addressing the "Commissioner of Patents, Washington, D. C."